UNITED STATES PATENT OFFICE.

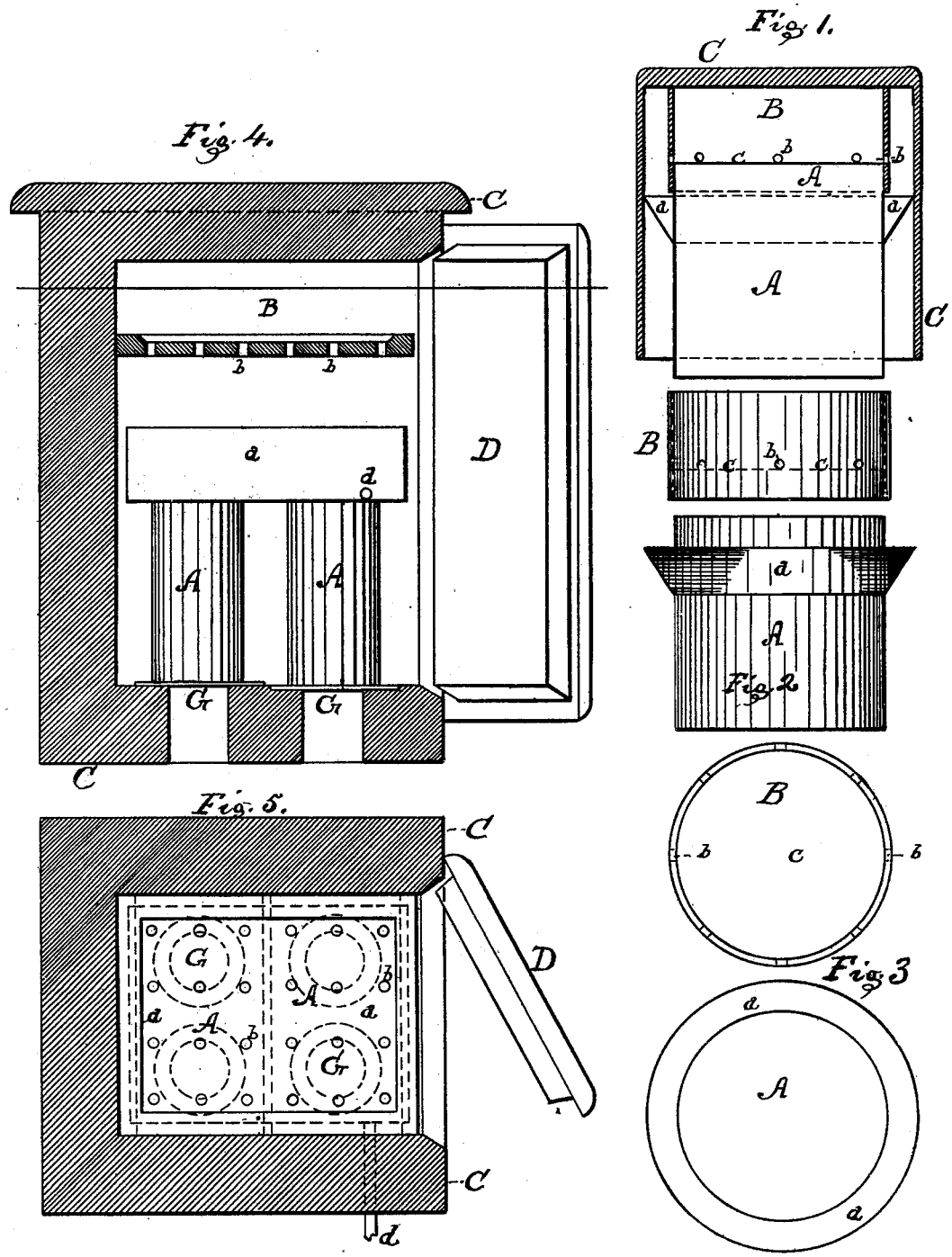

WILLIAM DRIPPS, OF COATESVILLE, PENNSYLVANIA.

IMPROVEMENT IN APPARATUS FOR COOLING MILK.

Specification forming part of Letters Patent No. 198,537, dated December 25, 1877; application filed January 15, 1877.

*To all whom it may concern:*

Be it known that I, WILLIAM DRIPPS, of Coatesville, in the county of Chester and State of Pennsylvania, have invented a new and useful Improvement in Apparatus for Cooling Milk for the production of cream, which improvement is fully set forth in the following specification, reference being had to the accompanying drawing.

The object of this invention is to provide an apparatus which shall so regulate the temperature of newly-drawn milk as to cause a maximum amount of cream to rise to its surface in the shortest time consistent with natural laws, while at the same time preserving the milk perfectly sweet and free from the absorption of impurities while the cream is in process of formation.

In order to accomplish the said object, advantage is taken of that natural law governing the circulation of fluids by virtue of which vertical currents are established whenever differences in the specific gravities of the particles composing a fluid are opposed to gravitation. As long as the surface of a fluid—at least within a certain range of temperature—is cooler than its bottom, ascending and descending currents of its particles will take place. A common method of causing such circulation is that of applying heat to the bottom of a vessel containing fluid. It is obvious, however, that the same effect may be produced to a certain extent by cooling the surface of the fluid, instead of heating its bottom or lower stratum. This abstract principle of cooling at the top is the fundamental principle underlying this invention. This method assists the natural ascent of the cream particles to the surface by establishing an early sinking of the upper and cooler particles of the newly-drawn warm milk toward the bottom of the vessel containing it, and the ascent of the warmer particles to the top, thus mechanically bearing up the particles of cream, or assisting their natural tendency to arise, the said particles, when once upon the surface, remaining there by virtue of their oily nature and consequent inferior specific gravity. If the milk be cooled from below or equally through its mass, there will be no circulation of a character suited to assist in the early and large formation of cream; but, on the contrary, the ascent of the cream will be retarded, and its quantity will be less than if a circulation be established to expedite and facilitate its natural formation at the surface of the milk.

The apparatus designed to carry out this principle can now be readily understood by reference to the drawing, forming part of this specification, in which—

Figure 1 is a vertical section through the apparatus; Fig. 2, an elevation of one can, showing its top detached; and Fig. 3, a plan of same. Fig. 4 is a vertical section of the apparatus in modified form—somewhat like a domestic refrigerator; and Fig. 5 is a horizontal section.

In Figs. 1, 2, and 3, A is a simple cylindrical can, provided with a cooling-receptacle, *a*, surrounding its upper part. B is a tight-fitting top, in the form of a short cylinder, in which is placed ice, or water of sufficiently low temperature, and from which the water flows through the holes *b* into the receptacle *a*. C is a cover or case inclosing the can A and its top B, and extending down to the bottom, or nearly to the bottom, of the can A.

The top B and the case C are both, preferably, made of wood, or some other non-heat-conducting material, though the bottom *c* of the top B should be made of metal, or of the same material as the case A.

In Figs. 4 and 5 is shown a modification of arrangement, where a number of cans are used within a single case or cover, C. In this modification, instead of each can having a separate cooling-receptacle, *a*, around its top, one single receptacle, in the shape of a somewhat shallow pan, *a*, Fig. 4, is substituted, which fits closely upon the top of each can within the case C, and into this pan the cooling water is received from the ice-chamber or primary reservoir B within the case C.

The case C, in Figs. 4 and 5, is provided with a door, D, and the pan *a* is provided, if desired, with a flexible tube, *d*, which passes out of the case C. This tube may be provided with any suitable plug, by opening which water can at any time be drawn for the purpose of testing its temperature or causing it to circulate.

The flexible tube *d* may be long enough to allow of the removal of the pan *a* from the case C, either for the purpose of cleaning the case or itself, or in order to facilitate the removal of the cans A.

Should it be desired to insure a greater difference of temperature between the tops and bottoms of the cans A, the bottom of the case C may be provided with holes, one hole for each can, to whose edges should be fitted rubber or other air-tight gaskets, as seen at G in Fig. 4. The cans A being set in or over these holes, and their lower ends packed air-tight by the said gaskets, the bottoms of the cans will be subjected to the temperature of the atmosphere in the apartment in which the apparatus is placed, while their tops will be exposed to the temperature of the ice or cold water in the receptacle or pan *a*, thus insuring a certain vertical circulation of the milk-currents.

It is, of course, to be understood that the air-tight joint at the bottom of the case C is not vital, but only auxiliary to the apparatus. Said joint may be used either with a single can surrounded by a small case, or with any number of cans inclosed within a case of any practicable magnitude.

The temperature of the dairy, or any apartment in which the apparatus may be placed, can, of course, be regulated at will, within any limits needed for the usual operations carried on in a dairy. In many situations plenty of running water may be found of sufficiently low temperature to be used instead of ice in this apparatus.

The advantages that this apparatus possesses over those milk-coolers heretofore in common use are efficiency, simplicity of construction, cheapness, and facility for perfect cleanliness. By its perfect adaptation to the requirements demanded by natural law, all the cream that the milk is capable of affording is collected, all atmospheric impurities are also excluded from the milk while the cream is forming, and the milk is retained in a perfectly sweet and pure state, the latter advantageous quality being frequently detroyed in the dairy in the effort to obtain a maximum amount of cream.

Another not inconsiderable advantage of this apparatus is in matter of stowage. Milk-cans of any depth required can be used. Thus a larger quantity of milk can practically be stowed in a smaller space than if shallow cans be used, and with no diminished quantity of cream produced.

This apparatus is also well adapted for economically cooling liquors and fluids other than milk where rapid cooling is not required, as dependence is mainly placed upon the natural process of connection instead of forced conduction.

Having thus fully described this apparatus as of my invention, I claim—

1. An apparatus for the cooling of milk and setting of cream, consisting of a case or shell, preferably of non-heat-conducting material, containing within its walls a milk can or cans and a refrigerating cell or cells, either superposing or circumposing, or both, the top or tops of the said can or cans, whereby access of air to the milk is excluded and air-currents practically prevented within the apparatus, convection currents within the milk being established, and the rising of the cream assisted by direct cell refrigeration at or near the top surface of the milk only, all substantially as specified.

2. In an apparatus for the cooling of milk, consisting of a case or shell containing within its walls a milk can or cans, an air-tight joint or joints between the lower extremity or extremities of said can or cans, and an opening or openings in the said case, whereby circulation of air between the exterior and interior of the apparatus is prevented, and the establishment of convection currents within the milk assisted, substantially as and for the purpose specified.

WILLIAM DRIPPS.

Witnesses:
W. D. DRIPPS,
EMMA FIESTER.